Jan. 20, 1959     E. V. BERGSTROM     2,870,088
ADSORBENT DRYING PROCESS AND APPARATUS
Filed July 11, 1955     4 Sheets-Sheet 1

INVENTOR
*Eric V. Bergstrom*
BY
*Andrew L. Labriault*
ATTORNEY

INVENTOR
Eric V. Bergstrom
BY
Andrew L. Laboriault
ATTORNEY

United States Patent Office 2,870,088
Patented Jan. 20, 1959

2,870,088

ADSORBENT DRYING PROCESS AND APPARATUS

Eric V. Bergstrom, Short Hills, N. J., assignor to Socony Mobil Oil Company, Inc., a corporation of New York Application July 11, 1955, Serial No. 521,093

2 Claims. (Cl. 208—305)

This invention deals with the removal of small amounts of undesirable impurities from liquid hydrocarbon oils in a treating zone by means of a granular solid adsorbent. It is particularly concerned with such processes in which the adsorbent is regenerated for re-use after being used in the purification step, and is more particularly concerned with conditioning the adsorbent between treating and regeneration steps to avoid excessive loss of hydrocarbon oil in the regeneration step and to avoid premature loss in activity of the adsorbent so that the adsorbent is able to be used through many repeated regenerations.

Typical of the processes to which this invention applies is the continuous countercurrent percolation of liquid mineral oils of low asphalt content upwardly through a downwardly gravitating mass of adsorbent in order to decolorize the oil.

This invention will be best understood by referring to the attached drawings, of which Figure 1 is a graph illustrating the variation of adsorbent life with moisture content of the adsorbent;

All of these figures are diagrammatic in form and like parts in all bear like numerals.

In processes of the above type, the usual method of regenerating the granular adsorbent is by burning therefrom, in a suitable oxygen-containing atmosphere, the undesirable impurities adsorbed thereon. Since the adsorbent removed from the treating zone is admixed with a substantial quantity of the hydrocarbon oil, it cannot be passed directly to the regeneration zone because in the latter zone the oil would be burned and therefore lost from the system. Such a loss in the normal case is enough to make the entire process completely uneconomical. It is therefore a practice of the prior art, such as U. S. Patent No. 2,701,786, to subject the adsorbent, after it has been removed from the treating zone, to a relatively low boiling wash solvent capable of dissolving from the adsorbent the adhering oil. If the treating operation is conducted at a relatively high temperature, for example, 300–400° F., it is usual to cool the adsorbent by some means so that during the washing step substantial quantities of solvent are not vaporized. Adsorbent from the washer, now mixed with solvent, is then passed to a drier which is typically a fluidized bed operation in which the adsorbent is subjected to a sufficiently high temperature to vaporize the solvent from it. The dried adsorbent is then passed to the regeneration zone. Fluidization is accomplished in such a drier in the prior art by using some inert gas, such as flue gas, or nitrogen or by using steam. Commercial operations thus far have generally always employed steam in the drying operation.

As explained in U. S. Patent No. 2,701,786, it is important that the moisture content of the adsorbent be maintained at all times below 4.5 percent by weight and preferably below 4 percent by weight. If at any time moisture exceeds this figure during the cyclic system, the adsorbing efficiency will drop off rapidly and the adsorbent will have to be replaced at great cost.

Figure 1:
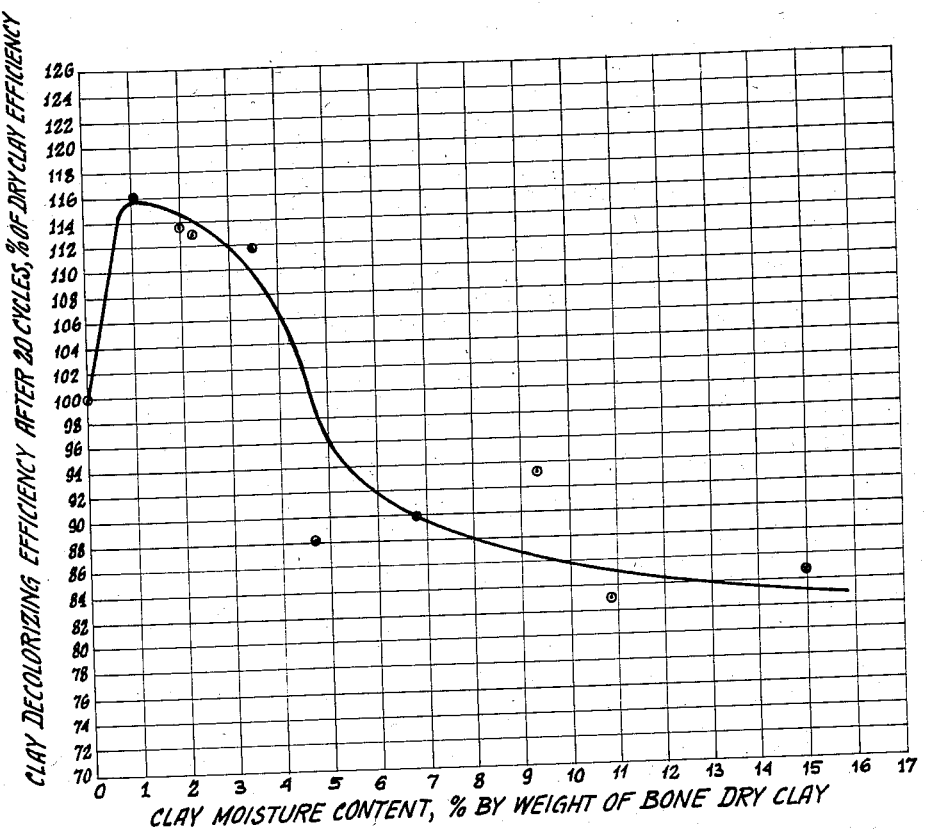

This is illustrated also in Figure 1, which shows the variation in decolorization efficiency of the 30–60 mesh fuller's earth adsorbent subjected to twenty cycles of hydration and dehydration, during each of which the adsorbent is dehydrated and then hydrated to a fixed moisture content. It is clear from this graph that repeated hydration to greater than 4½ percent by weight moisture content causes the adsorbent to fall quickly below the efficiency at which it entered the system and to remain permanently deactivated. In plotting this graph, adsorbent is taken to be bone dry after it has been heated to 1050° F. In order to avoid moisture deactivation, it was determined that the drier bed, when using any moisture-containing gas, should be at a temperature of at least 300° F. and preferably at least 350° F. It has now been discovered that even this is not the complete answer to the moisture problem. The adsorbent leaving the washer will, in almost all cases, be at a temperature substantially below 300° F. In commercial operations this stream is usually at the ambient atmospheric temperature normally in the vicinity of 90–100° F. It has been discovered that even though the boiling bed in the drier is maintained at 350° F., when the relatively cold adsorbent from the washer first enters the drier and is there subjected to the moisture-containing atmosphere, it immediately picks up sufficient moisture to exceed the 4½ percent by weight maximum. Thus, even though the fluidized bed in the drier is maintained above the temperature at which substantial quantities of moisture are adsorbed, the moisture adsorption nevertheless takes place with the above noted undesirable effects. The use of a readily available inert gas, such as flue gas rather than steam currently used, is not a satisfactory answer since, in order to function effectively, the flue gas would have to be dehydrated in some manner, a costly operation.

It is a major object of this invention to provide a method and apparatus for conditioning adsorbent between treating and regeneration zones of a liquid oil treating process which overcomes the above described deficiency of the prior art.

A specific object of this invention is to provide a method and apparatus for conditioning the adsorbent between treating and regeneration zones of a liquid oil treating process to efficiently and economically maintain the moisture content of the adsorbent during such conditioning below the level at which the adsorbent would be rapidly deactivated as it passed through successive conditioning cycles.

The above objects are accomplished in this invention by providing that the washer utilize a hydrocarbon solvent and by utilizing a portion of this solvent after vaporization as the agitating medium in the fluidized bed drier. A drier particularly suited to operation with such a fluidized medium consisting of a fluidized steam stripping chamber adjacent the drying chamber is also a part of this invention.

Figure 2:
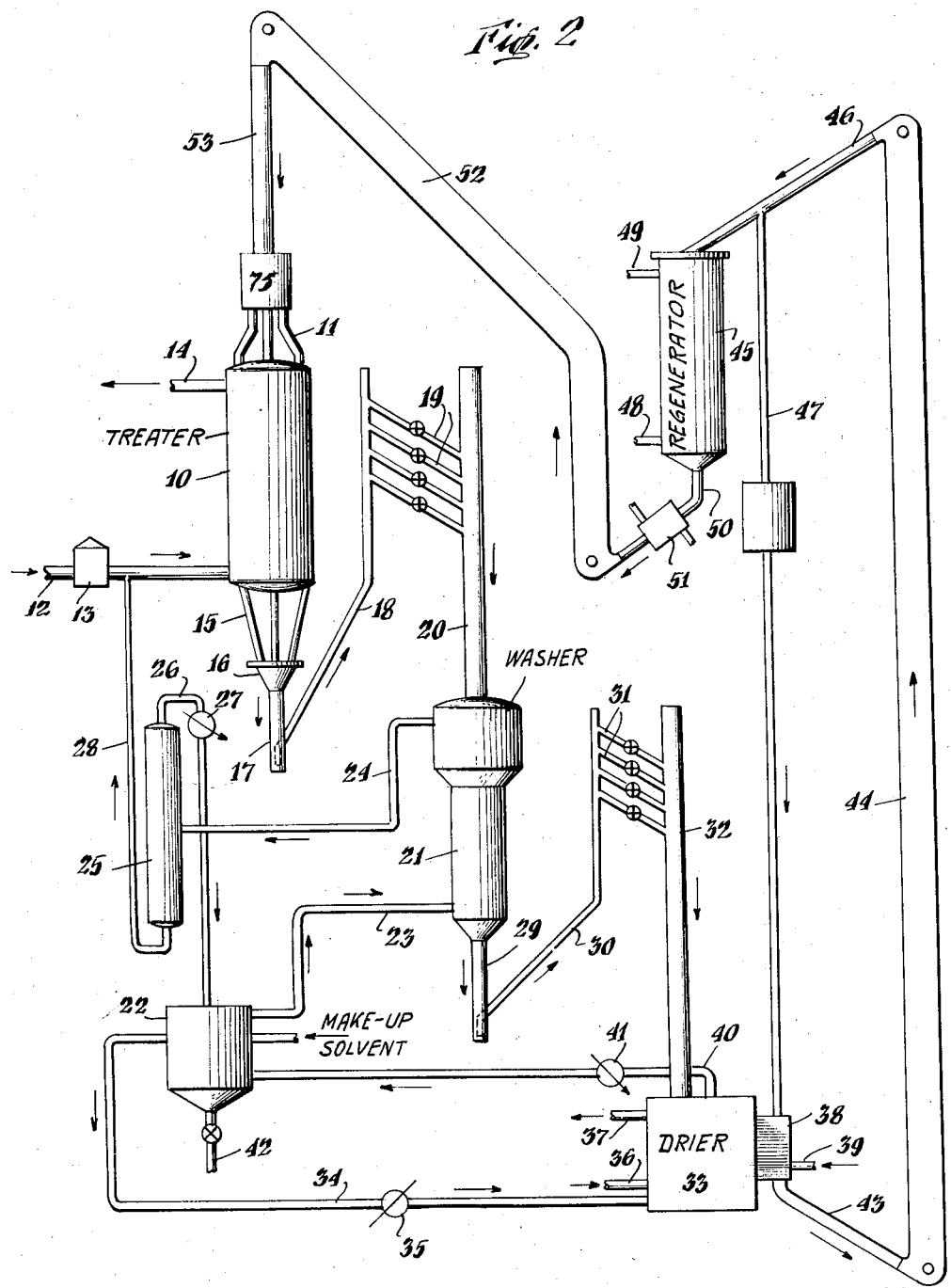
Figure 2 is a schematic flow diagram of a continuous lubricating oil process operating according to this invention.

This invention will be better understood by referring to the attached drawings, and more particularly, for the moment, Figure 2. In that drawing there is shown a treater 10, which is supplied at its upper end with a granular adsorbent through passages 11. Typical adsorbents which may be used are fuller's earth, bauxite, bentonite, bone char, charcoal, magnesium silicate, heat and acid activated kaolin, activated carbon and synthetic silica, alumina or magnesia gel or synthetic gel combinations thereof. The adsorbent should be of palpable particulate form as distinguished from finely divided powders, and should generally have a size within the range about 4–100 mesh, preferably 10–60, and still more preferably 15–30 mesh by Tyler standard screen analysis. The adsorbent particles may be of regular form such as spheres, capsules, pellets, and the like, or irregular form such as obtained from grinding and screening operations.

The liquid oil may be treated for a variety of purposes, including decolorization, removal of suspended, colloidal or dissolved carbon or coke or various gum forming compounds.

The adsorbent gravitates through the treating zone 10 as a columnar mass. During such gravitation the adsorbent may be in compacted condition, that is, with particles resting on and being supported by the particles immediately therebelow, or it may be in the expanded bed condition described and claimed in U. S. patent application, Serial Number 428,694, filed May 10, 1954, now abandoned, in which, while the particles do not rest upon each other, they are so confined by surrounding particles that they move substantially unidirectionally vertically downwardly through the treating zone. The term "columnar mass," as used herein, broadly refers to both of these conditions.

Liquid hydrocarbon charge, such as a mineral oil or fuel oil of low asphalt content, enters the system through passage 12. If desired, the oil may be preheated by heater 13 prior to introduction into treating zone 10. Suitable treating temperature may lie within the range 0 to 700° F., and a typical treating temperature is about 300° F. Oil charge passes into the lower section of treater 10 and upwardly into the descending adsorbent which effects the desired purification. Treated product is removed through passage 14. Spent adsorbent, having adsorbed thereon the impurities removed from the oil and admixed with substantial quantities of oil, gravitates from the treating zone through passages 15, which are combined in a collector 16, into a single stream that passes downwardly through passage 17. Adsorbent oil then passes into transport passage 18 which is of sufficiently reduced cross-section, compared to passage 17, that the adsorbent will exist therein suspended in and supported by the oil. Adsorbent and oil then flow outwardly through one of passages 19, a choice being made among these passages to determine the rate at which adsorbent is being removed from treater 10. (This system of flow rate control is described and claimed in U. S. patent application, Serial Number 424,956, filed April 22, 1954.)

Adsorbent and oil drop downwardly through conduit 20 into the upper section of a washer 21. Adsorbent flows downwardly through the washer as a columnar mass. An accumulation of a hydrocarbon wash solvent is maintained exterior to washer 21 in a tank 22. Suitable wash solvents include normal heptane, normal octane, and petroleum naphthas boiling within the range 100–400° F. A preferred solvent is a paraffinic naphtha boiling within the range 200–300° F. Solvent is passed from the accumulation when in tank 22 through passage 23 into the lower section of washer 21 and then upwardly therethrough to dissolve from the adsorbent adhering liquid oil while leaving adhered on the adsorbent undesirable impurities. The washing step may be conducted at atmospheric pressure or at any other pressure above or below atmospheric, or at any temperature below that at which substantial vaporization of the wash solvent occurs, for example, 60–250° F. In the usual case solvent is maintained at ambient temperatures in tank 22 so that the adsorbent is cooled as it moves through washer 21 to a temperature very close to the ambient temperature. In any case, the adsorbent, as it moves from the washer, will be substantially below 350° F. The used naphtha, having dissolved therein liquid oil, passes from the washer through conduit 24 into a stripper or fractionator 25. Within fractionator 25 solvent and liquid oil are separated by distillation, the solvent being taken overhead through passage 26, condensed by means of condenser 27 and returned to tank 22. Liquid oil is removed from the bottom of fractionator 25 and passed through conduit 28, to join with the charge entering the treater through conduit 22. A solids draw-off system, similar to the one employed on the treater, is used at the lower end of the washer, adsorbent and solvent passing through passage 21, being elevated through transport pipe 30, and removed therefrom through one of pipes 31. The adsorbent-solvent mixture, still at a temperature below 350° F., then drops through conduit 32 into the upper section of drier 33.

A stream of solvent is removed from tank 22 through conduit 34 and is vaporized and heated to a temperature in excess of 300° F., for example, 450° F., by means of heater 35. The vaporized solvent is then passed into the lower section of drier 33. A sufficient quantity of vaporized solvent is used to cause the adsorbent within the drier to exist as a fluidized bed. Sufficient heat is supplied to this bed to maintain its temperature at least about 300° F. by indirect heat exchange with a suitable heat transfer medium, such as steam being supplied to the indirect heat transfer mechanism through conduit 36 and removed from that mechanism through conduit 37. Within the drier the liquid solvent which entered with the adsorbent is vaporized. The dried adsorbent passes from drier 33 into purge or stripping zone 38 adjacent thereto. Steam or other inert gas is supplied to the lower section of zone 38 through passage 39 in sufficient quantity to maintain the adsorbent within the stripper as a fluidized bed. The temperature in the stripping zone is maintained above 350° F. at all times. The pressure in the stripping zone is maintained slightly above the pressure in the drying zone, so that the stripping gas, together with any solvent removed from the adsorbent, flows back into the drier 33. The total quantity of vaporized solvent and stripping gas is then removed through passage 40 and condensed by means of condenser 41 before being returned to tank 22. Where the stripping gas is condensible, such as steam, it may periodically be removed from tank 22 through passage 42. If a non-condensible stripping gas is used, it may be vented to the atmosphere from tank 22 or otherwise disposed of.

The dried adsorbent now existing in an inert gas atmosphere passes downwardly through a seal leg 43 into the lower section of a suitable conveyor 44, such as a bucket elevator or gas lift, by means of which the adsorbent is elevated to a position above the regenerator 45. The adsorbent is discharged from the conveyor through passage 46. The main body of the adsorbent flows to the upper section of regenerator 45 but a portion of the dried adsorbent is returned to stripping zone 38 through passage 47 to insure that if for some reason adsorbent flow to the drier or between drier and stripper is interrupted, seal leg 43 will not empty but will be supplied with adsorbent from passage 47. By this means escape of solvent vapor to the atmosphere or to the regenerator through the conveyor 44 and passage 46, which might be a dangerous fire hazard, is prevented at all times. A suitable design for this type of draw-off system is described and claimed in U. S. Patent 2,709,674.

Adsorbent gravitates downwardly through regenerator 45 and is subjected to an oxygen-containing gas supplied through passage 48 which acts to burn the adsorbed impurities therefrom. Flue gas formed by this burning action is removed through passage 49. Regenerated adsorbent passes from the regenerator through passage 50 and is cooled to the treating temperature by cooler 51. It is then conveyed to a position above treater 10 by means of conveyor 52. Adsorbent gravitates through passage 53 into a flow splitting device 75, from which it flows into treater 10 through passages 11.

It is readily apparent that in the above described system there is no point between treater and drier where the adsorbent is subjected to moisture at a temperature below 300° F. It is, of course, assumed that any make-up solvent is freed of water before being introduced to the system which would be necessary in any case to prevent moisture deactivation in the washing zone. The only point at which moisture contacts the adsorbent is in stripping zone 38, but the adsorbent enters this zone and remains at all times therein at a temperature above 300° F.

Figure 3:
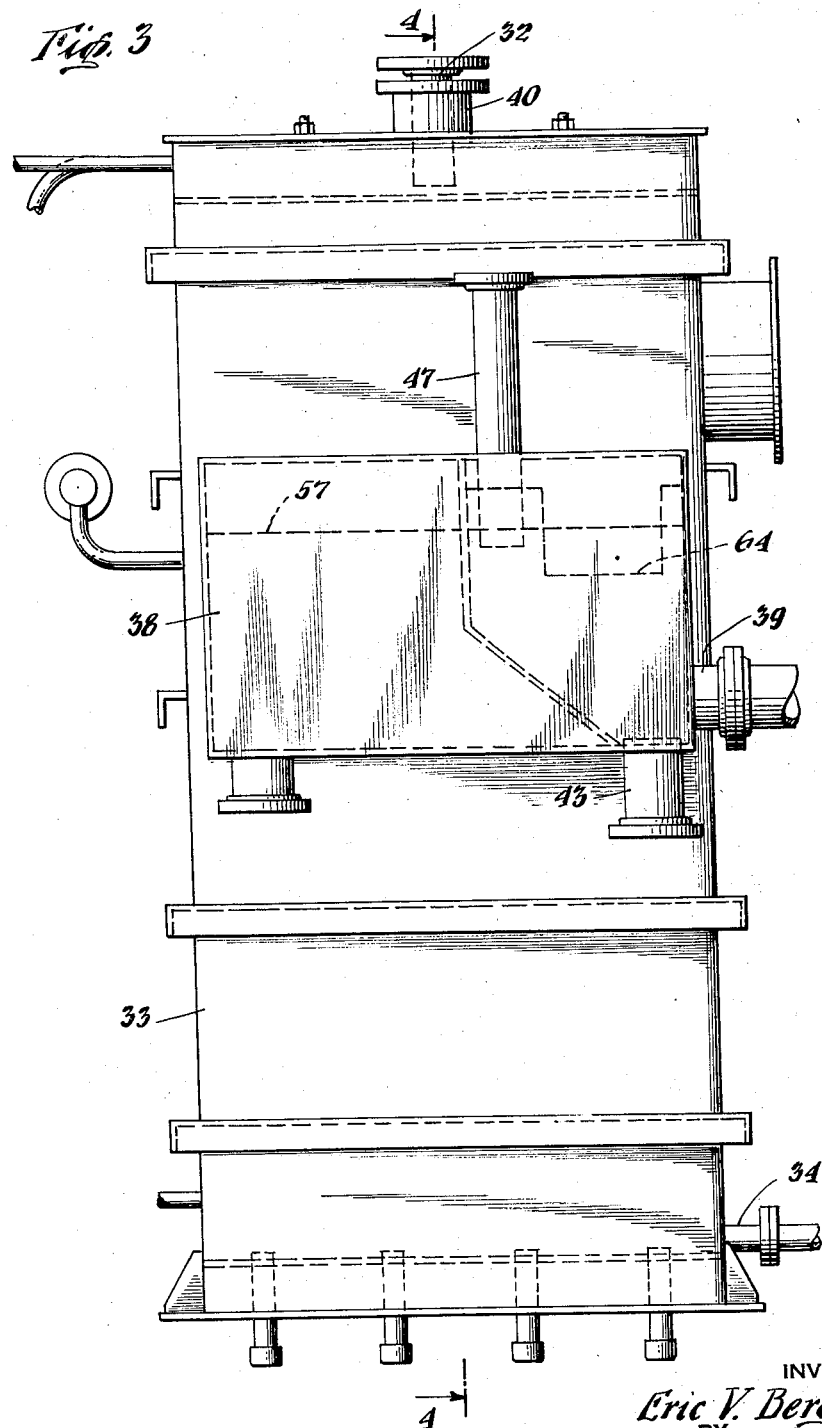
Figure 3 is an elevational view of one form of apparatus capable of operation according to this invention.
Figure 4:
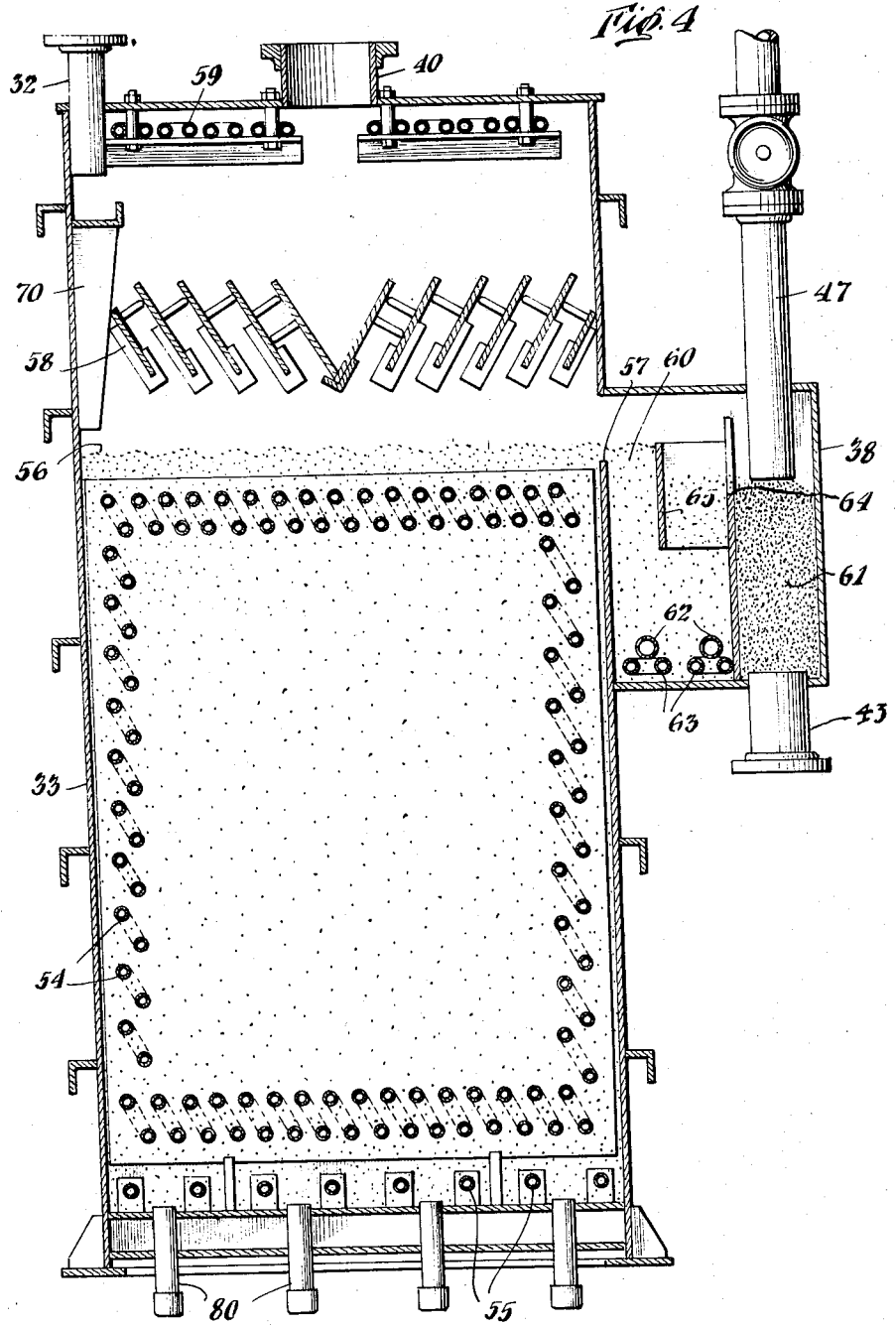
Figure 4 is an elevational sectional view taken along lines 4—4 of Figure 3.

Details of a suitable construction for drier and stripper are illustrated in Figures 3 and 4, which will be considered together. The drier consists of a rectangular-shaped, elongated chamber 33, the lower section of which is filled by spaced-apart heat transfer tubes 54. These tubes are connected in banks, each of which consists of a group of tubes in series. A suitable heat transfer medium supplied to one end of each bank while heat transfer fluid is removed from the other end. Extending across the lower end of the drier are a plurality of solvent vapor distributor pipes 55 which receive the heated solvent vapor from passage 34. Pipes 55 are equipped with a plurality of orifices through which solvent vapor is emitted to pass through the drying chamber to effect fluidization of the adsorbent therein. Other means of supplying solvent vapor to the drier may be used. For example, the vapor could enter through adsorbent drain legs 80 which could be equipped with bubble caps to effect uniform distribution. The wet adsorbent is supplied to one side of the drier through passage 32 and drops through funnel 70 onto the fluidized bed which will have a surface at about the position of line 56. The upper end of the fluidized bed is maintained in this position by means of a weir 57 extending along the length of the side of the drying chamber opposite the one adjacent adsorbent feed passage 32. Dried adsorbent overflows weir 57 into stripping chamber 38, which has a common wall with vessel 33. Above the upper end of the fluidized bed and above heating tubes 54 are maintained a plurality of baffles 58 which consist of inclined plates extending completely across the drying chamber. As vapor is emitted from the boiling bed it must pass between these plates which will act to force any entrained adsorbent from the vapor stream and cause it to drop back into the fluidized bed. Vapors then proceed up to the upper end of the drier where a major portion of them is reheated, by means of a suitable fluid circulated through tubes 59, in order to prevent condensation of the vapor at this point. The vapor then passes out of the drying chamber through conduit 40.

Chamber 38 is divided into a stripping zone proper 60 and draw-off or collecting chamber 61. Within the stripping zone proper suitable inert gas, such as steam, is supplied to the lower end of the chamber to distributor pipes 62. Heat may also be supplied by indirect heat exchange to the stripping chamber using coils 63. The pressure within the stripping zone proper 60 is maintained slightly above the pressure in the drying zone and the inert gas is supplied in sufficient quantity to keep the adsorbent fluidized within zone 60. Inert gas and the solvent vapor which it strips from the adsorbent pass back through weir opening 57 and are removed with the main stream of solvent vapor through passage 40. The adsorbent, now freed of solvent vapor, passes from zone 60 into zone 61 over a weir 64, which extends downwardly to a somewhat lower level than weir 57. Within zone 61, below weir 64, the adsorbent will gravitate downwardly as a compact mass. Baffle 65 extends longitudinally down chamber 60 between weirs 57 and 64 and removed from the walls which contain these weirs from a level above weir 57 to a level below weir 64, in order to prevent adsorbent from flowing over weir 57 and then immediately passing over weir 64 without being subjected to stripping gas to a substantial degree within zone 61. The dried stripped adsorbent passes from zone 61 through passage 43. If adsorbent flow is interrupted passage 43 will be supplied with adsorbent from recycle stream 47 in the manner described and claimed in U. S. Patent 2,709,674.

The dimensions of the various parts of systems capable of operation according to this invention will be dependent on a variety of factors, the most prominent of which are the throughput desired and the nature of the adsorbent being dried. Generally, however, it is desirable that the height of the drying vessel be greater than its lateral dimensions, and it should be sufficiently wide that adsorbent supplied through passage 32 will not immediately flow over weir 57 without first entering the fluidized bed.

As stated above, it is necessary at all times that the moisture content on the adsorbent be maintained below about 4.5 percent by weight and preferably below about 4.0 percent by weight. To achieve this it is imperative that adsorbent exit from the drying bed at a temperature of at least 300° F. and preferably at least 350° F. and that the stripping zone be maintained above about 300° F. For a determination of the above moisture limits, adsorbent which has been heated to 1050° F. is taken to be bone dry.

In most operations, it is undesirable for the temperature of the adsorbent to exceed 450° F. at any point outside of the regenerator, since above this temperature certain of the adsorbed impurities which should be burned may be distilled from the adsorbent. However, in some operations it is possible to use the drier as a preheater for the regenerator, in which case the drying zone temperature may be as high as 700° F.

*Example*

In a continuous lubricating oil decolorization process employing fuller's earth of a size within the range 15–30 mesh by Tyler standard screen analysis, decolorization was effected at 375° F. The used adsorbent was washed with a petroleum naphtha boiling within the range 220–350° F., and during the washing step the adsorbent was cooled to 100° F. A portion of the same petroleum naphtha was vaporized and heated to about 450° F. and supplied to the lower section of a drier of construction similar to that of Figures 3 and 4. The temperature within the drier was about 390° F. The adjacent stripping zone employed saturated steam at a temperature of about 350° F. as a stripping medium.

The drier used in the above operation was a rectangular vessel 5 feet 2 inches by 5 feet in lateral dimensions and 10 feet 4¼ inches high. Heat transfer tubes were situated throughout the lower section of the drying chamber from a level 7¼ inches from the bottom to 6 feet 5¾ inches above the bottom. The weir edge 57 was 3 feet 6½ inches from the top of the vessel and an 8 inch opening was provided above it along its entire length. Weir 57 extended 4 feet 8 inches along one of the 5 foot walls. Chamber 60 extended downwardly along the side of the drying vessel from the upper edge of the opening above weir 57 to a level 2 feet 9 inches therebelow. Weir 64 was 2 inches below weir 57 and was 1 foot 3 inches wide.

It is intended to cover herein all changes and modifications of the examples of this invention, chosen for purposes of disclosure, which do not constitute departures from the spirit and scope of the invention.

I claim:

1. In a continuous process for the decolorization of a liquid mineral oil by means of a granular adsorbent clay wherein the oil is countercurrently contacted with the adsorbent clay in a treating zone to effect the decolorization and the adsorbed color bodies are then burned from the adsorbent clay in a regeneration zone, the improved method of conditioning the adsorbent clay between treating and regeneration zones to prevent excessive loss of oil by burning in the regeneration step, which comprises: removing a stream of used adsorbent clay bearing the color bodies and admixed with mineral oil from the treating zone and passing said stream into a confined washing zone, maintaining an accumulation of petroleum naphtha boiling within the range about 100° F. to 400° F. exterior to said washing zone at a temperature below 300° F. and below the initial boiling point of said naphtha; passing naphtha from said accumulation into said washing zone and through the adsorbent clay therein to remove said oil from said adsorbent clay and to cool said adsorbent clay to a temperature below 300° F.; removing the naphtha with dissolved oil from said washing zone and passing said naphtha with dissolved oil to a separation zone; separating oil and naphtha in said separation zone and returning the oil to said treating zone; passing naphtha from said separation zone back to said accumulation; passing washed adsorbent clay admixed with naphtha from said washing zone into a confined drying zone; removing a stream of naphtha from said accumulation and heating said stream to a temperature sufficient to vaporize the naphtha; passing said vaporized naphtha into the lower section of said drying zone and upwardly therethrough at a rate sufficient to cause the adsorbent clay in the drying zone to exist as a fluidized solids bed; supplying sufficient heat to said bed to maintain the temperature of the bed above 300° F. and above the end boiling point of said naphtha whereby said adsorbent clay will be heated to a temperature of at least 300° F. and liquid naphtha on said adsorbent will vaporize and be removed from said adsorbent clay by upwardly flowing naphtha vapor; removing naphtha vapor from said drying zone and condensing said vapor to a liquid; returning said condensed vapor to said accumulation of naphtha; removing adsorbent clay freed of liquid naphtha and at a temperature of at least 300° F. from said drying zone; subjecting said adsorbent clay after removal to a stream of superheated steam at a temperature of at least 300° F. to purge naphtha vapors from the adsorbent clay; passing said steam and naphtha vapors after the purging action back into said drying zone to be removed with the naphtha vapors from said zone; passing the adsorbent clay after purging to the regeneration zone; and maintaining the moisture content of the adsorbent clay at all times below 4.5 percent by weight of the clay.

2. An apparatus for continuously drying solid contact material of palpable particulate form having vaporizable material associated therewith, which comprises in combination: an upright drying vessel adapted to confine a fluidized bed of contact material in its lower section, a plurality of spaced apart heat transfer tubes extending across the lower section of said vessel, means for supplying heat transfer fluid to said tubes and means for removing heat transfer fluid from said tubes, means for supplying vaporized material to the lower section of said vessel, at least one passageway for the supply of contact material to be dried extending into said vessel and terminating on a downwardly facing open discharge end adjacent one wall of said vessel at a level above said heat transfer tubes, a first weir extending through the wall of said vessel opposite the wall adjacent said contact material supply passageway at a level above said heat transfer tubes, a confined stripping chamber attached to the side of said drying vessel and having a common wall therewith which contains said first weir and positioned to receive dried contact material as it passes over said first weir, means for supplying inert gas to the lower section of said stripping chamber in sufficient quantity to fluidize the contact material in said stripping chamber and to maintain therein a pressure slightly above the pressure in the drying vessel, a second weir in the wall of said stripping chamber opposite the wall which contains said first weir, said second weir being at a lower level than said first weir, a baffle extending longitudinally across said stripping chamber parallel to said weirs, said baffle spaced away from the walls containing said two weirs and extending the length of the shortest of said first and second weirs and extending vertically from a level below said second weir to a level above said first weir, a collecting chamber positioned to receive contact material which passes over said second weir, means for removing contact material from the lower section of said collecting chamber and means for removing gaseous material from the upper section of said drying vessel.

References Cited in the file of this patent
UNITED STATES PATENTS

| | | |
|---|---|---|
| 2,487,806 | Hermanson et al. | Nov. 15, 1949 |
| 2,571,380 | Penick | Oct. 16, 1951 |
| 2,589,981 | Weeks | Mar. 18, 1952 |
| 2,701,786 | Evans et al. | Feb. 8, 1955 |
| 2,724,190 | Bergstrom | Nov. 22, 1955 |